US008349908B2

(12) United States Patent
Bleys et al.

(10) Patent No.: US 8,349,908 B2
(45) Date of Patent: Jan. 8, 2013

(54) FOAMED MATERIALS COMPRISING A MATRIX HAVING A HIGH HIGHBLOCK CONTENT AND PROCESS FOR PREPARING THEM

(75) Inventors: Gerhard Jozef Bleys, Heverlee (BE); Hans Godelieve Guido Verbeke, Lubbeek (BE)

(73) Assignee: Huntsman International LLC, The Woodlands, TX (US)

( * ) Notice: Subject to any disclaimer, the term of this patent is extended or adjusted under 35 U.S.C. 154(b) by 135 days.

(21) Appl. No.: 12/920,286

(22) PCT Filed: Mar. 4, 2009

(86) PCT No.: PCT/EP2009/052555
§ 371 (c)(1),
(2), (4) Date: Aug. 30, 2010

(87) PCT Pub. No.: WO2009/109600
PCT Pub. Date: Sep. 11, 2009

(65) Prior Publication Data
US 2011/0015287 A1    Jan. 20, 2011

(30) Foreign Application Priority Data
Mar. 7, 2008   (EP) ..................................... 08152477

(51) Int. Cl.
C08L 75/02    (2006.01)
(52) U.S. Cl. .......................... 521/137; 521/130; 521/170
(58) Field of Classification Search .................. 521/130, 521/137, 170
See application file for complete search history.

(56) References Cited

U.S. PATENT DOCUMENTS

| 4,234,693 A | 11/1980 | Wooler |
| 4,255,203 A | 3/1981 | Kranz et al. |
| 4,261,845 A | 4/1981 | Cuscurida |
| 4,794,129 A * | 12/1988 | Gillis et al. .................... 521/121 |
| 4,824,888 A | 4/1989 | Emmerling et al. |
| 5,070,114 A | 12/1991 | Watts et al. |
| 5,134,172 A * | 7/1992 | Bruyninckx et al. ......... 521/137 |
| 5,489,620 A | 2/1996 | Bleys |
| 5,525,654 A | 6/1996 | Podola et al. |
| 5,968,993 A | 10/1999 | Bleys |
| 6,218,462 B1 | 4/2001 | Pantone et al. |
| 6,355,721 B1 | 3/2002 | Pantone et al. |
| 6,384,130 B1 | 5/2002 | Pantone et al. |
| 6,403,702 B1 | 6/2002 | Markusch et al. |
| 6,503,980 B2 | 1/2003 | Pantone et al. |
| 6,806,342 B2 | 10/2004 | Bleys et al. |
| 2002/0123641 A1 | 9/2002 | Mente et al. |
| 2005/0004284 A1 | 1/2005 | Koenemann et al. |
| 2006/0084777 A1 | 4/2006 | Bleys et al. |
| 2008/0262168 A1 | 10/2008 | Bleys et al. |
| 2009/0005517 A1 | 1/2009 | Bleys et al. |

FOREIGN PATENT DOCUMENTS

| EP | 392788 | 10/1990 |
| EP | 547765 | 6/1993 |
| EP | 707607 | 4/1996 |
| EP | 912623 | 5/1999 |
| EP | 1 104 775 | 6/2001 |
| EP | 1 108 735 | 6/2001 |
| EP | 1 217 021 | 6/2002 |
| JP | 2001 323043 | 11/2001 |
| WO | WO 02/10249 | 2/2002 |
| WO | WO 03/048223 | 6/2003 |
| WO | WO 2004/111101 | 12/2004 |
| WO | WO 2007/042411 | 4/2007 |
| WO | WO 2007/096216 | 8/2007 |

OTHER PUBLICATIONS

David Randall and Steve Lee, Editors. *The Polyurethanes Book*, Wiley and Sons, 2002, p. 137-150.
Harry Chen, Jingcun Wang, Jianming Yu "A New Technique for Making MDI Smi-flexible Foams without Polyols", CPI Technical Conference, Sep. 24-26, 2007, Orlando (USA), pp. 154-161.
Yu Ming, Xu Qiang, and Wang Guiyou "Polyurethane Based Plasticizer", *Polyurethane Industry*, 2006, 21 (2), p. 1-3.
G. Woods, *ICI Polyurethanes Book*, 1990, $2^{nd}$ ed., pp. 32-35.

* cited by examiner

*Primary Examiner* — John Cooney
(74) *Attorney, Agent, or Firm* — Robert A. Diaz

(57) ABSTRACT

Foamed material having a density of less than 100 kg/m$^3$ and comprising
  a matrix material comprising a plurality of urea groups and having a hardblock content of more than 50% (hereinafter called matrix A); and
  a polymeric material which 1) has no groups which are able to form a urethane, urea or isocyanurate group with an isocyanate group, 2) is interpenetrating said matrix A, and 3) is a polymer having an average molecular weight of more than 500 which polymer comprises at least 50% by weight of oxyethylene groups based on the weight of this polymer (hereinafter called polymeric material B); and wherein the relative amount of all ingredients used to make said matrix A and of said polymeric material B, on a weight basis, ranges from 10:90 to 70:30 and process for making such materials.

9 Claims, No Drawings

FOAMED MATERIALS COMPRISING A MATRIX HAVING A HIGH HIGHBLOCK CONTENT AND PROCESS FOR PREPARING THEM

CROSS-REFERENCE TO RELATED APPLICATIONS

This application is the National Phase of International Application PCT/EP2009/052555 filed Mar. 4, 2009 which designated the U.S. and which claims priority to EP Provisional App. Serial No. 08152477.9 filed Mar. 7, 2008. The noted applications are incorporated herein by reference.

The present invention relates to foamed materials comprising a matrix having a hardblock content of more than 50%, the foamed material having a density of less than 100 kg/m$^3$ and comprising a plurality of urea groups.

Traditionally low density polyurethane foams are made by reacting a polyisocyanate and a polyol in the presence of a blowing agent, which often is water.

In order to get the properties of such foams right, a proper selection of types and amounts of polyols, surfactants, cross linkers and catalysts is an important part of the process. Generally a combination of catalysts is to be used. These catalysts are in the art referred to as gelling, blowing and isocyanurate catalysts; see The Polyurethanes Book by D. Randall and S. Lee, 2002 Wiley and sons, p. 137-150. The first type enhances the urethane formation while the second one promotes the reaction between the isocyanate and water. Further the amount of water and the index are critical. Failing to get the balance right may result in foam collapse, "boiling" foam, insufficient cure, scorching and even fire. Scorching can lead to discolorations, deterioration of properties and to formation of potentially dangerous, toxic compounds.

Making of low density polyurethane foams circumventing these problems could be accomplished by using prepolymers. Examples are EP 392788, EP 547765 and EP 707607. However in all these cases further improvements can be made. In all these cases a considerable amount of the isocyanate is consumed in the reaction with polyols and not used in the blowing reaction. Further making such prepolymers is a complex and expensive process. The use of these prepolymers is cumbersome because of viscosity and mixing ratio problems.

In a recent article by Harry Chen et al. presented at the CPI Technical Conference in Orlando, Fla., USA on 24-26 Sep. 2007 MDI semi-flexible foams having a very low density were made without polyols by reacting polyisocyanate and water in the presence of two non-reactive additives. The additives behave as plasticizers which soften the hard polymer matrix and provide flexibility to the foams. Chen does not disclose the chemical nature of the additives.

Surprisingly the present invention allows for the production of foams having a very low density without scorching and without the need for a careful balancing of components and catalyst types and with a minimum of different types of ingredients and with good properties like acoustic properties, insulating properties, low emissions, resulting amongst others in less fogging, and good thermal stability, together with easy processing.

Therefore the present invention is concerned with a foamed material having a density of less than 100 kg/m$^3$ and comprising:
a matrix material comprising a plurality of urea groups and having a hardblock content of more than 50% (hereinafter called matrix A); and
a polymeric material which 1) has no groups which are able to form a urethane, urea or isocyanurate group with an isocyanate group, 2) is interpenetrating said matrix A, and 3) is a polymer having an average molecular weight of more than 500 which polymer comprises at least 50% by weight of oxyethylene groups based on the weight of this polymer (hereinafter called polymeric material B); and wherein the relative amount of all ingredients used to make said matrix A and of said polymeric material B, on a weight basis, ranges from 10:90 to 70:30.

Further the present invention relates to a process for preparing the above material which process comprises reacting the ingredients for making the above matrix A in the presence of the above polymeric material B wherein the relative amount of the ingredients for making matrix A and of the above polymeric material B, on a weight basis, ranges from 10:90 to 70:30.

Some of the polymeric materials B may have been disclosed as such and may have been proposed as plasticizers in polyurethane materials; see e.g. U.S. Pat. No. 6,503,980, U.S. Pat. No. 6,384,130, U.S. Pat. No. 6,355,721, U.S. Pat. No. 6,218,462, U.S. Pat. No. 4,824,888, EP 1104775, EP 1108735, EP 1217021 and Polyurethane Industry 2006, 21 (2): 1-3 or in other applications; see e.g. U.S. Pat. No. 4,261,845, U.S. Pat. No. 4,255,203, WO 03/048223, US 2002/0123641 and U.S. Pat. No. 5,525,654.

Disclosures related to polyurethane materials having a high hardblock content are EP 912623, WO 02/10249, WO 04/111101, WO 07/042411 and WO 07/096216; the materials described have a rather high density.

In the context of the present invention the following terms have the following meaning:
1) isocyanate index or NCO index or index:
the ratio of NCO-groups over isocyanate-reactive hydrogen atoms present in a formulation, given as a percentage:

$$\frac{[NCO] \times 100}{[\text{active hydrogen}]} (\%).$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual polymerisation process preparing the material involving the isocyanate ingredient and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are not taken into account in the calculation of the isocyanate index. Only the free isocyanate groups and the free isocyanate-reactive hydrogens (including those of water) present at the actual polymerisation stage are taken into account.

2) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual polymerisation process one hydroxyl group is considered to comprise one reactive hydrogen, one primary amine group is considered to comprise one reactive hydrogen and one water molecule is considered to comprise two active hydrogens.
3) Reaction system: a combination of components wherein the polyisocyanates are kept in one or more containers separate from the isocyanate-reactive components.
4) The term "average nominal hydroxyl functionality" (or in short "functionality") is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.
5) The word "average" refers to number average unless indicated otherwise.
6) The term "hardblock content" refers to 100 times the ratio of the amount (in pbw) of polyisocyanate+isocyanate-reactive materials having a molecular weight of 500 or less (wherein polyols having a molecular weight of more than 500 incorporated in the polyisocyanates are not taken into account) over the amount (in pbw) of all polyisocyanate+all isocyanate-reactive materials used in making the matrix. In this calculation the amount of the polymeric material B used is not taken into account.
The hardblock content of matrix A preferably is at least 75%, more preferably at least 90% and most preferably 100%.
7) Density: Is the overall density measured according to ISO 845.

The polymeric material B is a material which has no groups which are able to form a urethane, urea or isocyanurate group with an isocyanate group. Further this polymeric material B has an average molecular weight of more than 500 and preferably of more than 500 to 12000 and more preferably of 800-6000. Still further this polymeric material comprises at least 50% by weight of oxyethylene groups based on the weight of this polymeric material B.

The polymeric material B may be made by reacting at an index of 100-250 a polyisocyanate with a polymer having an average molecular weight of more than 500 which polymer comprises at least 50% by weight of oxyethylene groups based on the weight of this polymer and which polymer has one isocyanate-reactive group. The polyisocyanate for making this polymeric material B may be selected from aliphatic and, preferably, aromatic polyisocyanates. Preferred aliphatic polyisocyanates are hexamethylene diisocyanate, isophorone diisocyanate, methylene dicyclohexyl diisocyanate and cyclohexane diisocyanate and preferred aromatic polyisocyanates are toluene diisocyanate, naphthalene diisocyanate, tetramethylxylene diisocyanate, phenylene diisocyanate, tolidine diisocyanate and methylene diphenyl diisocyanate (MDI) and polyisocyanate compositions comprising methylene diphenyl diisocyanate (like so-called polymeric MDI, crude MDI, uretonimine modified MDI and prepolymers having free isocyanate groups made from MDI and polyisocyanates comprising MDI). MDI and polyisocyanate compositions comprising MDI are most preferred and especially those from 1) a diphenylmethane diisocyanate comprising at least 35%, preferably at least 60% and most preferably at least 85% by weight of 4,4'-diphenylmethane diisocyanate (4,4'-MDI); 2) a carbodiimide and/or uretonimine modified variant of polyisocyanate 1), the variant having an NCO value of 20% by weight or more; 3) a urethane modified variant of polyisocyanate 1), the variant having an NCO value of 20% by weight or more and being the reaction product of an excess of polyisocyanate 1) and of a polyol having an average nominal hydroxyl functionality of 2-4 and an average molecular weight of at most 1000; 4) a diphenylmethane diisocyanate comprising homologues comprising 3 or more isocyanate groups; and 5) mixtures of any of the aforementioned polyisocyanates. Polyisocyanates 1) and 2) and mixtures thereof are most preferred.

Polyisocyanate 1) comprises at least 35% by weight of 4,4'-MDI. Such polyisocyanates are known in the art and include pure 4,4'-MDI and isomeric mixtures of 4,4'-MDI and up to 60% by weight of 2,4'-MDI and 2,2'-MDI. It is to be noted that the amount of 2,2'-MDI in the isomeric mixtures is rather at an impurity level and in general will not exceed 2% by weight, the remainder being 4,4'-MDI and 2,4'-MDI. Polyisocyanates as these are known in the art and commercially available; for example Suprasec$^R$ MPR and 1306 ex Huntsman (Suprasec is a trademark of the Huntsman Corporation or an affiliate thereof which has been registered in one or more but not all countries).

The carbodiimide and/or uretonimine modified variants of the above polyisocyanate 1) are also known in the art and commercially available; e.g. Suprasec$^R$ 2020, ex Huntsman. Urethane modified variants of the above polyisocyanate 1) are also known in the art, see e.g. The ICI Polyurethanes Book by G. Woods 1990, $2^{nd}$ edition, pages 32-35.

Polyisocyanate 4) is also widely known and commercially available. These polyisocyanates are often called crude MDI or polymeric MDI. Examples are Suprasec$^R$ 2185 and Suprasec$^R$ DNR ex Huntsman.

Mixtures of the aforementioned polyisocyanates may be used as well, see e.g. The ICI Polyurethanes Book by G. Woods 1990, $2^{nd}$ edition pages 32-35. An example of such a commercially available polyisocyanate is Suprasec$^R$ 2021 ex Huntsman Polyurethanes.

The polymer having an average molecular weight of more than 500 which polymer comprises at least 50% by weight of oxyethylene groups based on the weight of this polymer and which polymer has one isocyanate-reactive group used for making this polymeric material B may be selected from monools, monoamines and monocarboxylic acids having at least 50% by weight of oxyethylene groups and mixtures thereof, preferably having a molecular weight of more than 500 to 6000 and more preferably of 800-3000. Such polymers are known and commercially available; examples are Jeffamine® M2070, and M1000 ex Huntsman; Jeffamine is a trade mark of the Huntsman Corporation or an affiliate thereof which has been registered in one or more but not all countries.

Most preferred are the polyether monools and monoamines, especially monoalkylether polyoxyethylene polyoxypropylene monools and monoamines having an average molecular weight of more than 500 to 6000 and preferably of 800-3000 wherein the oxyethylene content is at least 50% by weight calculated on the weight of the monool or monamine and wherein the alkyl group preferably has 1-8 carbon atoms. Monoamines are most preferred.

A preferred polymeric material B is the reaction product of an aromatic polyisocyanate and a polymer having an average molecular weight of 800-3000 and comprising at least 50% by weight of oxyethylene groups based on the weight of this polymer.

The relative amounts of the polyisocyanate and the polymer having one isocyanate-reactive group may vary in such a way that the index is 100-250 and preferably 100-150. This polymeric material B may be prepared by combining and mixing the polyisocyanate and the polymer and allowing the mixture to react. These reactions are exothermic and do not need heating or catalysis although catalysts may be used, heat may be applied and the MDI may be added at slightly elevated temperature (e.g. up to 60° C.) in order to ensure liquidity.

After the reacting mixture has cooled back to room temperature, the reaction may be regarded as complete. When the reaction is conducted at an index of 100, urea groups are formed from the amine groups and the isocyanate groups, urethane groups are formed from the hydroxy groups and isocyanate groups and amide groups are formed from the carboxylic acid and isocyanate. When the reaction is conducted at an index of more than 100, the excess of the isocyanate groups is to react with formed urea groups leading to biuret groups and/or formed urethane groups leading to allophanate groups and/or formed amide groups leading to acylurea groups. This reaction preferably is encouraged by conducting the reaction at elevated temperature, e.g. 80 to 150° C. for e.g. 30 minutes to 24 hours. The composition obtained contains compounds comprising urea and/or urethane groups and/or amide groups and—in case the index was above 100—compounds comprising biuret and/or allophanate and/or acylurea groups and does not form urethane, urea or isocyanurate groups in the presence of isocyanates, polyols and polyamines. No other reactants are used in preparing polymeric material B.

Matrix A is made by reacting a polyisocyanate and water at an index of 10-100 and preferably of 15-80, optionally in the presence of a catalyst, catalyzing the reaction between a polyisocyanate and water, and at a hardblock content of more than 50%.

The foamed material having a density of less than 100 kg/m$^3$ is made by conducting this reaction between a polyisocyanate and water in the presence of polymeric material B, wherein the relative amount, on a weight basis, of the ingredients to make said matrix A and of said polymeric material B ranges of from 10:90 to 70:30 and preferably of from 20:80 to 60:40. Usually an amount of more than 1% by weight of water, calculated on the weight of polyisocyanate used in making matrix A, is used.

Preferably the amount of water is 2-50 and most preferably 4-30% by weight, calculated on the weight of the polyisocyanate used in making matrix A.

In making matrix A a catalyst may be used and preferably is used. If a catalyst is used, preferably only one catalyst is used. The catalyst is selected from tertiary amine catalysts and organometallic catalysts. Tertiary amine catalysts are preferred; especially those having, apart from the first nitrogen atom, one or more further hetero atoms; more preferably such further hetero atoms being nitrogen and/or oxygen and most preferably those having hetero atoms which are linked to each other with an ethylene group.

Examples of organometallic catalysts are stannous 2-ethylhexanoate, dialkyl tin dicarboxylates and dialkyl tin mercaptides, like dibutyltin dilaurate and dibutyltin dilaurylmercaptide, and lead octoate.

Examples of tertiary amine catalysts are N,N-dimethylethanolamine, N,N-dimethylcyclohexylamine, bis(N,N-dimethylaminoethyl)ether, N,N,N',N',N''-pentamethyldiethylenetriamine, 1,4-diazabicyclo[2.2.2]octane, 2-(2-dimethylaminoethoxy)-ethanol, 2-((2-dimethylaminoethoxy)-ethyl methyl-amino)ethanol, 1-(bis (3-dimethylamino)-propyl)amino-2-propanol, N,N',N'' tris (3-dimethylamino-propyl)hexahydrotriazine, dimorpholinodiethylether, N,N-dimethylbenzylamine, N,N,N',N'',N''-pentamethyldipropylenetriamine and N,N'-diethylpiperazine. Most preferred tertiary amine catalysts are bis-(N,N-dimethylaminoethyl)-ether, N,N,N',N',N''-pentamethyldiethylene triamine, 2-(2-dimethylaminoethoxy)-ethanol, 2-((2-dimethylaminoethoxy)ethyl methyl-amino)-ethanol and N,N'-diethyl-piperazine.

When used the amount of catalyst will generally range from 0.01 to 5% by weight calculated on the weight of the water used in making matrix A and preferably from 0.02 to 2% by weight. Often the catalysts are commercially sold in solution, like in ethylene glycol, diethylene glycol, propylene glycol or dipropylene glycol in a weight ratio of catalyst: solvent of e.g. 70:30. In the above amounts of catalyst the amount of solvent is taken into account. Hence a dissolved catalyst is also regarded as a catalyst in the context of the present invention.

In making matrix A, the polyisocyanates may be selected from aliphatic and, preferably, aromatic polyisocyanates. Preferred aliphatic polyisocyanates are hexamethylene diisocyanate, isophorone diisocyanate, methylene dicyclohexyl diisocyanate and cyclohexane diisocyanate and preferred aromatic polyisocyanates are toluene diisocyanate, naphthalene diisocyanate, tetramethylxylene diisocyanate, phenylene diisocyanate, tolidine diisocyanate and methylene diphenyl diisocyanate (MDI) and polyisocyanate compositions comprising methylene diphenyl diisocyanate (like so-called polymeric MDI, crude MDI and uretonimine modified MDI). MDI and polyisocyanate compositions comprising MDI are most preferred.

Especially preferred are those from 1) a diphenylmethane diisocyanate comprising at least 35%, preferably at least 60% and most preferably at least 85% by weight of 4,4'-diphenylmethane diisocyanate (4,4'-MDI); 2) a carbodiimide and/or uretonimine modified variant of polyisocyanate 1), the variant having an NCO value of 20% by weight or more; 3) a urethane modified variant of polyisocyanate 1), the variant having an NCO value of 20% by weight or more and being the reaction product of an excess of polyisocyanate 1) and of a polyol having an average nominal hydroxyl functionality of 2-4 and an average molecular weight of at most 1000; 4) a diphenylmethane diisocyanate comprising homologues comprising 3 or more isocyanate groups; and 5) mixtures of any of the aforementioned polyisocyanates. Polyisocyanates 1), 2), 4) and mixtures thereof are especially preferred and polyisocyanate 4) is most preferred.

Polyisocyanate 1) comprises at least 35% by weight of 4,4'-MDI. Such polyisocyanates are known in the art and include pure 4,4'-MDI and isomeric mixtures of 4,4'-MDI and up to 60% by weight of 2,4'-MDI and 2,2'-MDI. It is to be noted that the amount of 2,2'-MDI in the isomeric mixtures is rather at an impurity level and in general will not exceed 2% by weight, the remainder being 4,4'-MDI and 2,4'-MDI. Polyisocyanates as these are known in the art and commercially available; for example Suprasec$^R$ MPR and 1306 ex Huntsman (Suprasec is a trademark of the Huntsman Corporation or an affiliate thereof which has been registered in one or more but not all countries).

The carbodiimide and/or uretonimine modified variants of the above polyisocyanate 1) are also known in the art and commercially available; e.g. Suprasec$^R$ 2020, ex Huntsman. Urethane modified variants of the above polyisocyanate 1) are also known in the art, see e.g. The ICI Polyurethanes Book by G. Woods 1990, 2$^{nd}$ edition, pages 32-35.

Polyisocyanate 4) is also widely known and commercially available. These polyisocyanates are often called crude MDI or polymeric MDI. Examples are Suprasec$^R$ 2185 and Suprasec$^R$ DNR ex Huntsman.

Mixtures of the aforementioned polyisocyanates may be used as well, see e.g. The ICI Polyurethanes Book by G. Woods 1990, 2$^{nd}$ edition pages 32-35. An example of such a commercially available polyisocyanate is Suprasec$^R$ 2021 ex Huntsman Polyurethanes.

In addition to the above ingredients used for making a foamed material according to the present invention and matrix A, other ingredients used in the art for making such materials may be used, like 1) Isocyanate-reactive materials having a molecular weight of more than 500, selected from polyester polyols, polyether polyols, polyether polyester polyols, polyester polyamines, polyester polyether polyamines and polyether polyamines. Preferably these isocyanate-reactive materials have an average molecular weight of more than 500-10,000 and an average nominal functionality of 2-6. Such materials have been widely described in the art and are commercially available. When such materials are used the amount needs to be limited in order to ensure that the hardblock content of matrix A is more than 50%.
2) Isocyanate-reactive materials having a molecular weight of at most 500, when used in making matrix A, may be selected from the chain extenders and cross-linkers commonly used in making foamed materials of this type like ethylene glycol, polyethylene glycol having an average molecular weight of at most 500, 2-methyl-1,3-propanediol, neopentylglycol, propanediol, butanediol, pentanediol, hexanediol, ethylene diamine, diethanolamine, triethanolamine, toluene diamine, propylene glycol, polypropylene glycol having an average molecular weight of at most 500, glycerol, trimethylolpropane, sucrose and sorbitol and mixtures thereof
3) Other catalysts, e.g. for enhancing urethane formation or trimerization, surfactants, fire retardants, colorants, pigments, anti-microbial agents, fillers, internal mould release agents, cell-stabilizing agents, cell-opening agents, other blowing agents, expandable microbeads and fumed silica's.

In preparing the foamed materials, the polymeric material B may be added to the reaction mixture independently or after having been premixed with one or more of the ingredients used to make matrix A.

The reaction of the polyisocyanates with the water is strongly exothermic and does not require heating or catalysis, although the polyisocyanates may be supplied at slightly increased temperature (e.g. up to 50° C.) to ensure liquidity, although heat may be supplied and although a catalyst may be used as described above.

The reactions for preparing the foamed material in general will go to completion between 1 minute and 2 hours and preferably between 1 minute and 1 hour.

The reaction for preparing the foamed material according to the present invention may be conducted in an open container, in an open or closed mould, as a slabstock process, a lamination process or after the ingredients have been sprayed or applied on a substrate.

The foamed material according to the present invention is a so-called semi-interpenetrating polymer network wherein the polymeric material B penetrates on a molecular scale the polymer network which is matrix A (see IUPAC Compendium of Chemical Terminology, $2^{nd}$ Edition, 1997).

The foamed material may be widely used, e.g. in acoustic absorption in vehicles and buildings and in textile liners and as thermal and vibrational insulation materials.

The density of the foamed material according to the present invention preferably is 5-50 kg/m³ and more preferably 8-25 kg/m³.

A foamed material which is especially contemplated according to the present invention is a foamed material comprising a matrix A which has been made by reacting a diphenylmethane diisocyanate, comprising homologues comprising 3 or more isocyanate groups, and water in the presence of a catalyst, catalysing the reaction between polyisocyanate and water, and of polymeric material B, without using any other ingredient.

The invention is illustrated with the following examples.
The following ingredients were used:

Jeffamine M2070, a linear polymer having an average molecular weight of about 2000 and comprising at one end a methyl group and at the other a primary amine group and oxyethylene and oxypropylene groups in between, with an oxyethylene content of 76% by weight calculated on the weight of the polymer.

Jeffamine M1000, as M2070 but with 86% by weight oxyethylene groups and an average molecular weight of about 1000.

Jeffamine M600, as M2070 but with 10% by weight oxyethylene groups and average molecular weight of about 600.

Suprasec 1306 and 2185: described before.

Jeffamine M2005, as M2070 but with 8% by weight of oxyethylene groups.

AB/25-8 is a polymeric material B and is a polyalkylene glycol allyl butyl ether having a molecular weight of about 1800 and an oxyethylene content of about 75% by weight; obtainable as Polyglycol AB/25-8 ex Clariant.

AB/1500 is Polypropyleneglycol AB1500 ex Clariant; a poly propylene glycol alkyl butyl ether having a molecular weight of about 1500.

Tegostab B8418: a surfactant from Degussa.

Jeffcat ZF22: a blowing catalyst ex Huntsman; Jeffcat is a trademark of Huntsman Corporation or on affiliate thereof which has been registered in one or more but not all countries.

EXAMPLE 1

Polymeric materials B 1-4 were made as follows. The monofunctional ingredient was put in a 5 liter flask recipient equipped with a stirrer, thermocouple and nitrogen purge. Polyisocyanate was added slowly under stirring (Suprasec 1306 was preheated at 50° C.). No extra heat was applied.

The following Table 1 gives the polyisocyanates, monofunctional ingredients and index used and the viscosity, in cPs at 25° C. measured with a Brookfield Viscometer CAP 2000⁺ with CAP spindle number 1, of the polymeric materials B obtained.

TABLE 1

| Polymeric material B | Polyisocyanate | Monofunctional ingredient | Index | Viscosity |
|---|---|---|---|---|
| 1 | S1306 | M2070 | 100 | 3200 |
| 2 | S1306 | M600 | 100 | 11050 |
| 3 | S1306 | M2070/M1000 (80/20, w/w) | 100 | liquid at 40° C. |
| 4 | S1306 | M2005 | 100 | 4300 |

Infrared analysis showed no free NCO groups in these polymeric materials B and the presence of urea groups.

Foamed materials were produced by mixing the ingredients, detailed in table 1, for 30 seconds at 2500 rounds per minute with a mixer, pouring the mixture so obtained in a 10 liter bucket and allowing it to rise. After 1 day the foams were cut in blocks of 10×10×5 cm and the physical properties indicated in Table 1 were measured. Table 1 also contains the type of ingredients used and the amounts in parts by weight.

Polyisocyanate 1 is a mixture of Suprasec 2185 and MDI comprising about 20% by weight of 2,4'-MDI and about 80% by weight of 4,4'-MDI, the weight ratio of Suprasec 2185:MDI being 77:23.

Polyisocyanate 2 is Suprasec 2528 ex Huntsman. Suprasec 2528 is a prepolymer based on MDI and polymeric MDI having an NCO value of about 25.2% by weight and comprising about 21% by weight of reacted polyol having a molecular weight of more than 1000.

| Experiment | 1 | 2 | 3 | 4* | 5* | 6 | 7* | 8 | 9* |
|---|---|---|---|---|---|---|---|---|---|
| Polyisocyanate type/amount | 1/57 | 1/57 | 1/57 | 1/40 | 1/40 | 2/100 | 1/57 | 1/57 | 1/57 |
| Polymeric material B1 | 75 | — | 50 | — | — | 80 | — | — | — |
| 2 | — | — | — | 80 | 50 | — | — | — | — |
| 3 | — | 75 | — | — | — | — | — | — | — |
| 4 | — | — | — | — | — | — | 75 | — | — |
| AB/25-8 | — | — | — | — | — | — | — | 75 | — |
| AB 1500 | — | — | — | — | — | — | — | — | 75 |
| Water | 15 | 20 | 15 | 2.7 | 2.7 | 15 | 15 | 7.5 | 7.5 |
| Jeffcat ZF 22 | 0.2 | 0.2 | 0.2 | 0.2 | 0.2 | 0.2 | 0.2 | 0.2 | 0.2 |
| Tegostab B 8418 | 0.1 | 0.1 | 0.2 | 0.2 | 0.2 | 0.2 | 0.3 | 0.3 | 0.3 |
| Index | 25 | 19 | 25 | 100 | 100 | 36 | 25 | 54 | 54 |
| Hardblock content of matrix A, % | 100 | 100 | 100 | 100 | 100 | 85 | 100 | 100 | 100 |
| Density, kg/m$^3$, ISO 845 | 19 | 15 | 10 | 31 | 21 | 14 | — | 18 | — |
| Compression Load Deflection, kPa, ISO 3386-1, at 40%1) | 10 | 8 | 6 | 24 | 22 | 1 | — | 8 | — |
| Type of foam obtained | semi-rigid | semi-rigid | semi-rigid | rigid | rigid | visco-elastic | powdery material | semi-rigid | powdery material |

*comparative
1)measured during the first compression cycle

When experiments 1 and 2 were repeated without polymeric material B a powdery material was obtained.

Experiments 4 and 5 are comparative. The foams crumbled when compressed. When these experiments were repeated with more water (index 36), the foam collapsed.

Experiment 6 is according to the present invention but it is a less preferred foam since it is too soft (CLD at 40% only 1 kPa).

Experiments 7 and 9 are also comparative showing the use of polymeric material B type of materials but having a lower oxyethylene group content.

EXAMPLE 2

Example 1, experiment 1 was repeated without using Tegostab B 8418. A nice foam was obtained having a density (ISO 845) of about 20 kg/m$^3$.

The invention claimed is:

1. A foamed material having a density of less than 100 kg/m$^3$ and comprising
    a matrix material comprising a plurality of urea groups and having a hardblock content of more than 50%, wherein the matrix is the reaction product of a diphenylmethane diisocyanate, comprising a homologue comprising 3 or more isocyanate groups, and water; and
    a polymeric material which 1) has no groups which are able to form a urethane, urea or isocyanurate group with an isocyanate group, 2) is interpenetrating said matrix, and 3) is a polymer having an average molecular weight of more than 500 wherein the polymer comprises at least 50% by weight of oxyethylene groups based on the weight of the polymer; and wherein the relative amount of all ingredients used to make said matrix and of said polymeric material, on a weight basis, ranges from 10:90 to 70:30.

2. The foamed material according to claim 1 wherein the hardblock content in the matrix is at least 75%.

3. The foamed material according to claim 2 wherein the hardblock content in the matrix is at least 90%.

4. The foamed material according to claim 1 wherein the polymeric material is the reaction product of an aromatic polyisocyanate and a polymer having an average molecular weight of 800-3000.

5. The foamed material according to claim 1 wherein the density of the foamed material is 5-50 kg/m$^3$.

6. The foamed material according to claim 1 wherein the relative amount of all ingredients used to make the matrix and the polymeric material, on a weight basis, ranges from 20:80 to 60:40.

7. A process for preparing a foamed material according to claim 1 comprising reacting the ingredients for making the matrix in the presence of the polymeric material wherein the relative amount of the ingredients for making the matrix and the polymeric material, on a weight basis, ranges from 10:90 to 70:30.

8. The process according to claim 7 wherein the polymeric material is the reaction product of an aromatic polyisocyanate and a polymer having an average molecular weight of 800-3000 and wherein the matrix is made by reacting a diphenylmethane diisocyanate, comprising a homologue comprising 3 or more isocyanate groups, and water.

9. The process according to claim 8 wherein the matrix is made by reacting the ingredients for making the matrix in the presence of a catalyst, and catalysing the reaction between polyisocyanate and water, and of polymeric material, without using any other ingredients.

* * * * *